March 14, 1933.  F. BOOMER  1,901,798
NUT HULLING MACHINE
Filed Jan. 5, 1932  3 Sheets-Sheet 1
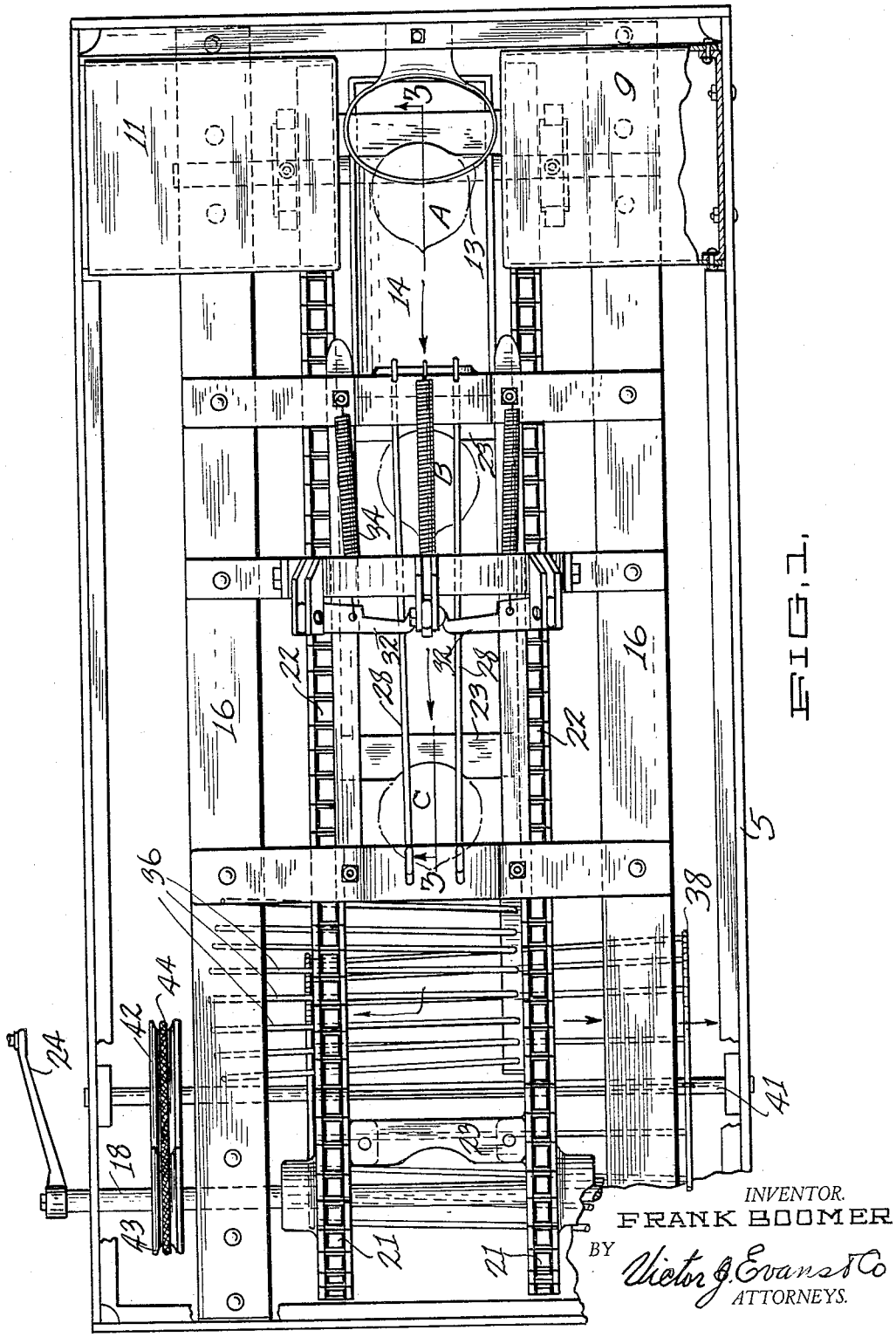
INVENTOR.
FRANK BOOMER
BY Victor J. Evans & Co
ATTORNEYS.

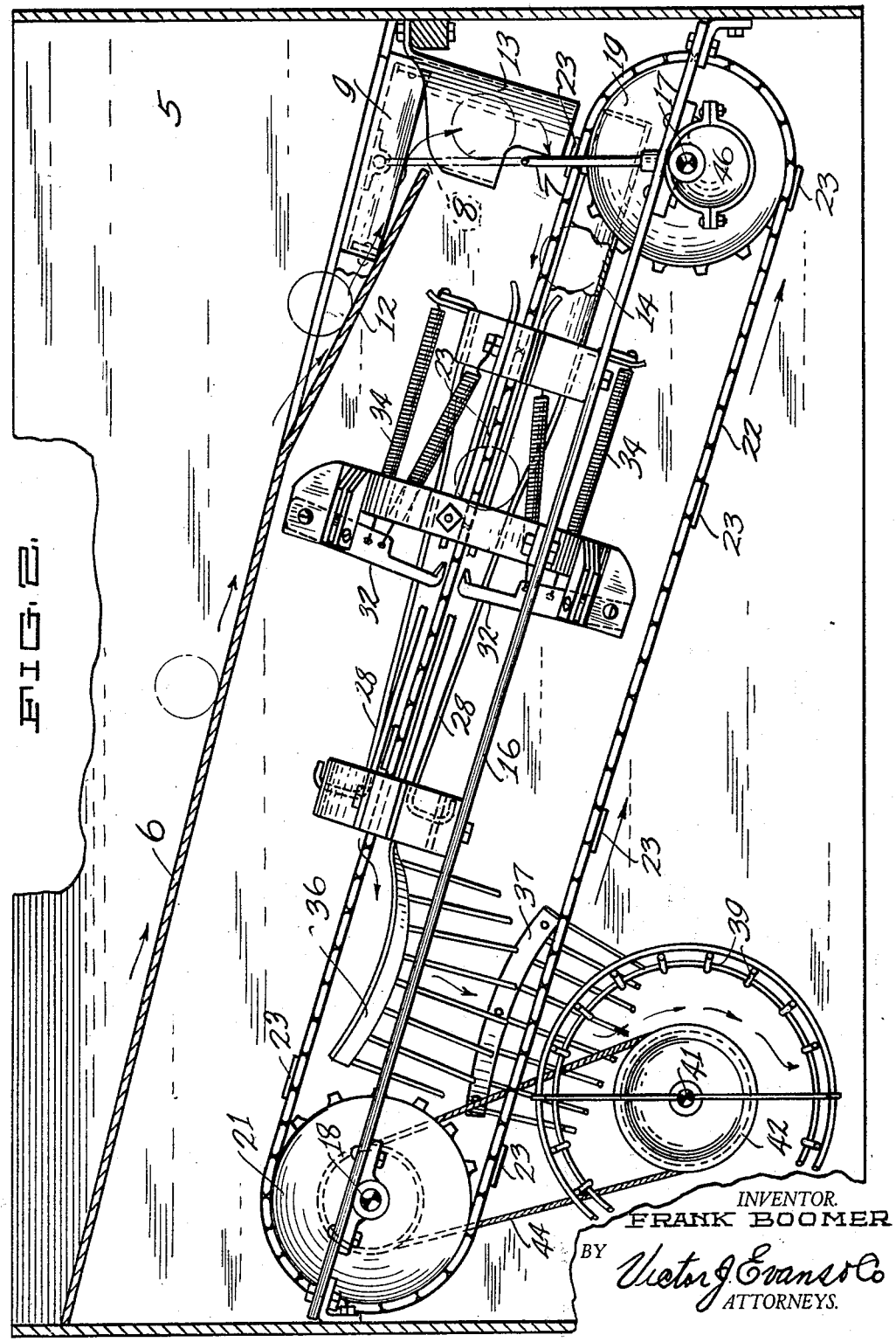

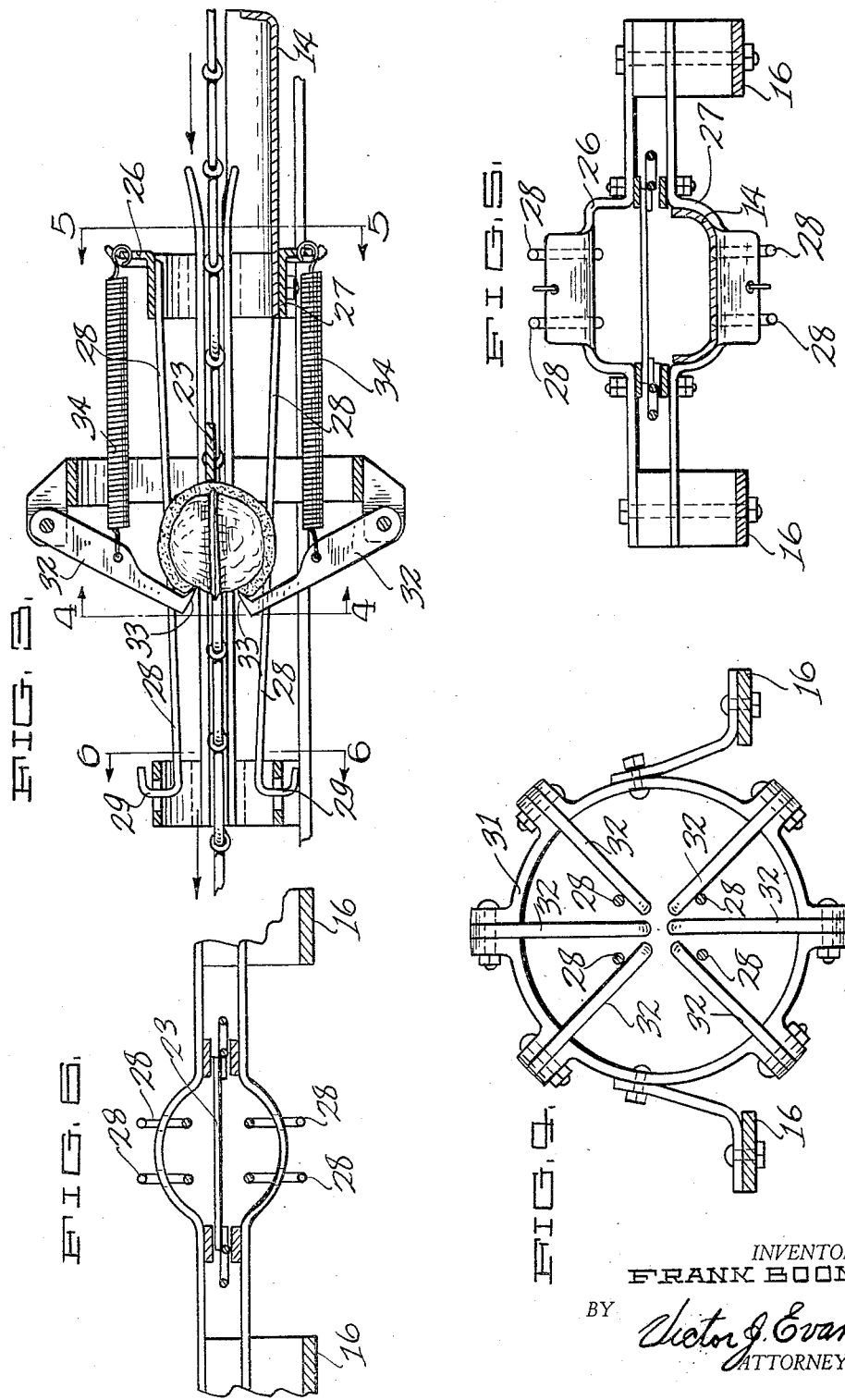

Patented Mar. 14, 1933

1,901,798

UNITED STATES PATENT OFFICE

FRANK BOOMER, OF BERKELEY, CALIFORNIA

NUT HULLING MACHINE

Application filed January 5, 1932. Serial No. 584,851.

This invention relates to improvements in nut hulling machines.

The principal object of the invention is to provide means for removing the hulls from walnuts and the like nuts.

A further object is to produce a device wherein the nuts will be progressively passed through the machine and individually hulled.

A further object is to produce a device which is easy to operate.

A still further object is to produce a device which is simple in construction and therefor economical to manufacture.

Other objects and advantages will be apparent during the course of the following description.

In the accompanying drawings forming a part of this specification and in which like numerals are employed to designate like parts throughout the same, Fig. 1 is a top plan view of my machine with the agitator hopper board removed, Fig. 2 is a side elevation of Fig. 1 and partly in cross section, Fig. 3 is a detail view of the hull removing mechanism, Fig. 4 is a cross sectional view taken on the line 4—4 of Fig. 3, Fig. 5 is a cross sectional view taken on the line 5—5 of Fig. 3, and Fig. 6 is a cross sectional view taken on the line 6—6 of Fig. 3.

There are many types of nuts which have a protecting hull, which must be removed before the product is commercially salable. English walnuts are one of the nuts of this type, and for a matter of discussion we will confine ourselves to English walnuts.

Referring to Figs. 1 and 2, it will be noted that a box-like structure 5 has positioned therein an inclined hopper board 6 capable of being agitated through the medium of rods 7 and 8, which are connected to plates 9 and 11, respectively, and positioned beneath the lower end of the hopper board 6. A centrally disposed incline 12 formed in the hopper board is adapted to feed the nuts to a chute 13 secured to the box-like structure 5. The lower end of this chute overlies a trough 14 into which the nuts fall. Parallel supports 16 mounted within the box serve to support shafts 17 and 18 on which are mounted spaced wheels 19 and 21, respectively, and over these wheels are sheaved sprocket chains 22. Between these chains and spaced at regular intervals are pusher plates 23. The shaft 18 has a handle 24 connected thereto, through which the shaft may be rotated, the result being that as the shaft 18 is rotated, motion is transmitted through the wheels 21 to the chains 22 and the pusher plates 23. As these pusher plates move over the trough 14 they will engage the nut as shown at A, Fig. 1, and move the same over the trough through a pair of spaced spring holders 26 and 27 and between guide wires 28 (there being four of these, see Fig. 4). These guide wires converge toward their free ends 29 so as to center the nut by the time it reaches the position B of Fig. 1.

The nut will now pass through a ring 31 (see Fig. 4), which ring has pivoted therein a plurality of hulling fingers 32, each provided with a pointed extremity 33, which is adapted to engage the nut and pierce the hull thereof. Springs 34 are attached to each of the hulling fingers and to the spring supports 26 and 27. It will thus be evident that as the nut is progressed from the position B to the position C, that these fingers will tear the hull from the nut and consequently remove the same, which hull will usually drop off. However, if the hull does not entirely fall away from the shell of the nut, it will be shaken therefrom in the manner to be now described.

As the nut passes out of engagement with the guide wires 28, it will fall upon a wire chute 36 and will be discharged into a lower chute 37 and thence into a rotating separator 38. The said separator is constructed of parallel bars 39 and is mounted upon a shaft 41. This shaft is rotated through the medium of a pulley 42 which underlies a pulley 43 mounted upon the shaft 18. A belt 44 connects these two pulleys. Eccentrics 46 mounted upon the shaft 17, causes the rods 7 and 8 to vibrate the plates 9 and 11 and the hopper board 6. As a consequence the nuts, with the hulls thereon, will be fed through the chute 13 to the trough 14, where they will be individually engaged by the plates 23 and moved into contact with the hulling arms. The hull will then be stripped therefrom. The nuts and their hulls will then next be passed through the machine and separated, leaving the nuts free of their hulls, and in a commercial condition.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:—

1. In a device of the character described, a conveyor mechanism including spaced chains, a plurality of pusher plates connected to said chain and extending therebetween, a trough positioned between said chains, means for feeding nuts to said trough, guide wires positioned adjacent one end of said trough, whereby nuts engaged by said pusher plates will be moved from said trough onto said guide wires, a plurality of hulling fingers radially arranged with respect to the path of movement of said nut, said fingers having pointed extremities for engaging the hulls on the nuts as they pass said fingers.

2. In a device of the character described, a conveyor mechanism including spaced chains, a plurality of pusher plates connected to said chain and extending therebetween, a trough positioned between said chains, means for feeding nuts to said trough, guide wires positioned adjacent one end of said trough, whereby nuts engaged by said pusher plates will be moved from said trough onto said guide wires, a plurality of hulling fingers radially arranged with respect to the path of movement of said nut, said fingers having pointed extremities for engaging the hulls on the nuts as they pass said fingers, and restraining means connected to each of said fingers to cause said points to enter the hulls.

In testimony whereof I affix my signature.

FRANK BOOMER.